Aug. 16, 1966 J. N. BEEBE ET AL 3,267,413
ECHO SIGNAL DETECTION AND DISPLAY APPARATUS
Filed Oct. 23, 1963
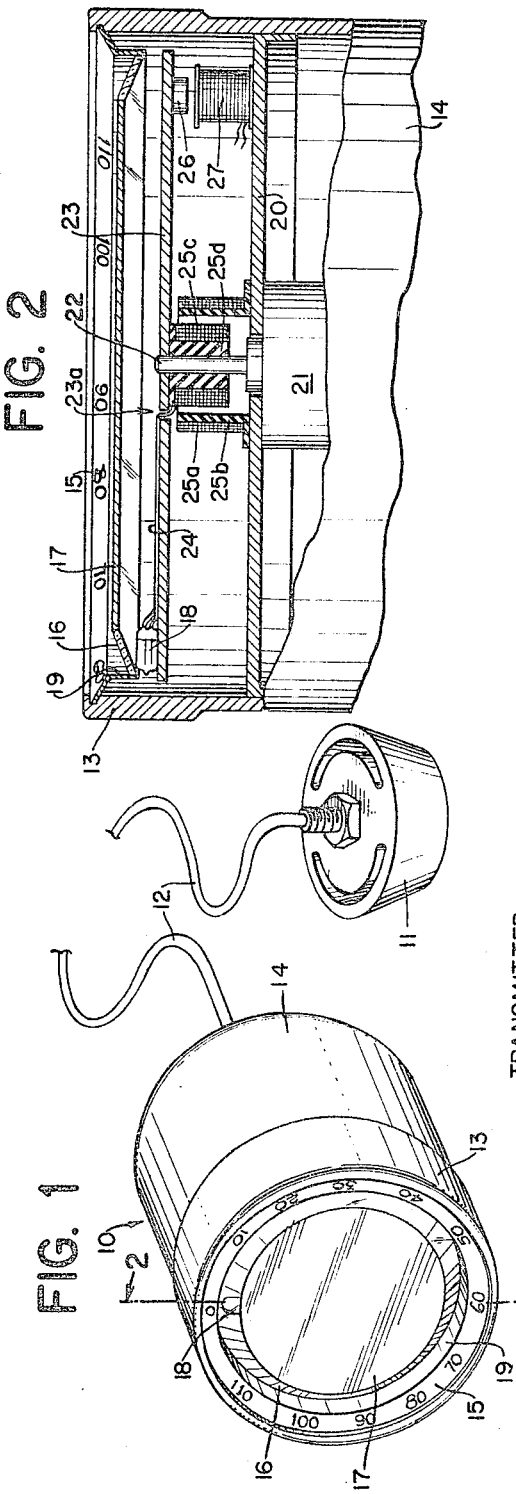
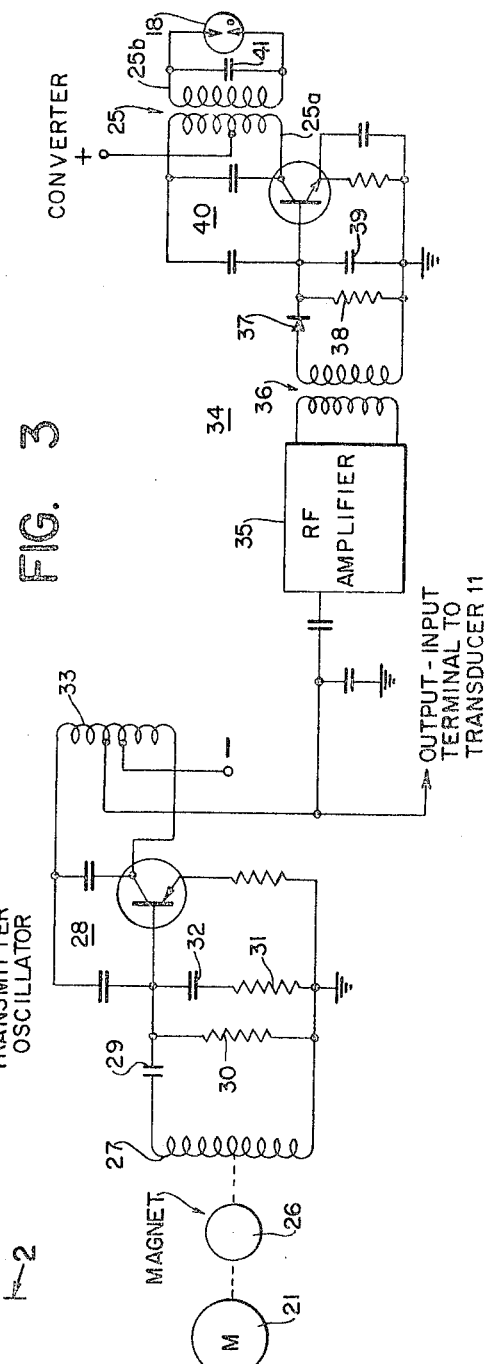
INVENTORS
JOHN N. BEEBE
JACQUES P. PERRON
BY
Donald Brown
AGENT

United States Patent Office 3,267,413
Patented August 16, 1966

3,267,413
ECHO SIGNAL DETECTION AND DISPLAY
APPARATUS
John N. Beebe and Jacques P. Perron, San Mateo, Calif.,
assignors to Raytheon Company, Lexington, Mass., a
corporation of Delaware
Filed Oct. 23, 1963, Ser. No. 318,312
6 Claims. (Cl. 340—3)

The present invention relates to depth sounding and indicating devices and more particularly to echo signal detection and display apparatus wherein indications of water depth are visibly displayed by means of a calibrated circular scale and a rotating light source associated with the scale, the light source being flashed "on" at an angular position corresponding to the water depth. Specifically, the invention provides detection and display apparatus which converts pulse echoes to D.C. signals, reconverts all D.C. signals having amplitudes above a threshold level to intermittent oscillatory signals and, by means of a rotary coupling transformer, couples the intermittent oscillatory signals to a rotating indicator lamp.

In depth sounding devices, sonic pulses (e.g. having a fundamental frequency component at 200 kilocycles per second), are transmitted by means of a transducer through the water, reflected from the bottom and received at the transducer. Measurement of the elapsed time from transmission of a pulse to reception of the echo thereof provides a direct measurement of the depth of water below the transducer.

Heretofore, in depth sounding devices which display the measured water depth by means of a flashing light indicator, it has been the practice to convert the received, relatively high frequency (200 kc.) echo pulse signals into D.C. pulse signals. These D.C. pulse signals are then amplified using audio amplifiers. The amplified D.C. pulse signals are coupled, via slip-rings and brushes, to the rotating neon indicator lamp. Rotation of the neon lamp and transmission of the sonic pulses are synchronized such that the angular displacement of the lamp with respect to a "zero" or index position is directly related to the elapsed time since the transmission of the last pulse. The lamp angular displacement is therefore calibrated in terms of depth of water below the transducer.

It has been found that, in the prior are devices such as described above, the mechanical slip-ring and brush assembly is subject to wear and misadjustment, particularly in the adverse environment in which depth sounding devices are generally used. Furthermore, where the depth sounder circuitry is arranged to produce D.C. pulse signals to actuate the depth indicator lamp, it has been found that such an arrangement is responsive to noise as well as to true signal echoes.

In contrast to such prior art depth sounding devices, the present invention provides an oscillator circuit, substantially unresponsive to D.C. pulse signals below a threshold level, for producing intermittent oscillatory signals in response to received signal echoes. Furthermore, the intermittent oscillatory signals produced by the oscillator circuit are coupled to the rotating indicator lamp by means of a rotary coupling transformer, the secondary winding of the coupling transformer being coupled to and arranged to rotate with the indicator lamp while the primary winding thereof is not rotatable. The oscillator circuit is arranged to produce intermittent oscillatory signals at frequencies above the audio range but below the operating frequency of the transmitter. Choice of such an oscillator frequency makes it possible to construct the rotary coupling transformer utilizing a light-weight non-ferrous core. The resulting small size, light-weight rotary transformer and the relatively small drive motor required to rotate such apparatus makes it possible to construct depth sounders of this type for use in small as well as large boats. The rotary transformer avoids the problems associated with the slip-ring and brush arrangement and furthermore, the apparatus is relatively insensitive to noise below a threshold level.

The invention will now be further described by reference to the accompanying drawings in which:

FIG. 1 is a perspective view of a depth sounding and indicating device of the "flashing light" type embodying the present invention;

FIG. 2 is a partial sectional view taken along the line 2—2 of FIG. 1; and

FIG. 3 is a partial electrical schematic diagram of a depth sounding and indicating device embodying the present invention.

Referring to FIG. 1, there are shown a depth indicating device 10 and a sonic transducer 11 which are normally coupled together by means of a cable 12. Sonic transducer 11 in a typical installation consists of a single disc of barium titanate potted in a salt water resistant plastic. Indicating device 10 includes an indicator case 13 and an electronic chassis case 14 coupled together in interfitting relationship. A depth indicating scale 15, an annular viewing window 16 and a central support disc 17 form the enclosure at one end of indicator case 13. A circular transparent plate (not shown) constructed, for example, of glass may be mounted in front of scale 15, window 16 and disc 17 to form a seal to prevent entry of water. A rotatable neon indicator lamp 18 is mounted behind window 16.

Referring to FIG. 2, depth indicating scale 15 is tilted inwardly to reduce light reflections and to facilitate viewing thereof. The face of depth indicating scale 15 is preferably of a light absorbent color (e.g. black) while the numerals are of a light reflective color (e.g. white). Annular viewing window 16, constructed of light-transmissive material such as glass or a clear plastic, is tilted in the opposite direction with respect to scale 15. Window 16 is coupled between support disc 17 and a black, light absorbent ring 19, the latter being an extension of the material of scale 15 turned inwardly to meet window 16.

A centrally apertured stationary base 20 extends across the cylindrical opening within case 10 and is secured to the walls of case 10. A synchronous motor 21, arranged to operate at, for example, 1200 r.p.m. is mounted on the underside of base 20 and has a shaft 22 projecting through the central aperture in base 20. A rotary arm 23 is coupled to shaft 22 for rotation therewith. Neon indicator lamp 18 is aligned with annular viewing window 16 and is fastened to rotary arm 23 near one extremity thereof. Electrical leads 24, extending through an aperture 23a in rotary arm 23, couple indicator lamp 18 to the secondary winding 25c of a rotary coupling transformer 25. Secondary winding 25c is wound on a cylindrical core 25d of insulating material, core 25d (and winding 25c) being fastened to rotary arm 23 for rotation therewith. Shaft 22 extends through the central aperture of cylindrical core 25d. The primary winding 25a of transformer 25 is wound on a second cylindrical core 25b of insulating material. Core 25b is fastened to base 20 and is substantially concentrically disposed about secondary winding 25c and core 25d. Sufficient clearance is provided between core 25b and winding 25c to permit rotational movement of secondary winding 25c and core 25d with respect to primary winding 25a and core 25b. A permanent magnet 26, mounted near one extremity of rotary arm 23, rotates with arm 23. A keying coil 27, operatively associated with magnet 26, is fastened to base 20 at a predetermined point on the circular path traveled by magnet 26. For example, magnet 26 and indicator lamp 18 are shown as being mounted at diametrically opposite points on rotary arm 23. In this case, keying coil 27 is mounted on base 20 at a point substantially diametrically opposite to the location of the 0 (zero) depth indication on scale 15.

Referring now to FIG. 3, the circuit components and connections associated with the structure shown in FIGS. 1 and 2 will be described. While the physical locations and relationships of motor 21, magnet 26 and keying coil 27 are shown in FIG. 2, the operational relationship of each of these parts to the remainder of the electrical circuitry is shown in FIG. 3. Keying coil 27 is coupled to a normally quiescent transistor Hartley oscillator circuit 28 by means of a coupling capacitor 29 and a pulse shaping network, the pulse shaping network comprising resistors 30 and 31 and capacitor 32. The oscillatory output of Hartley oscillator 28, which may, for example, be at a frequency of the order of 200 kc. is coupled, by means of autotransformer 33, both to a sonic transducer such as transducer 11 in FIG. 1 and to a receiving and indicating circuit indicated generally by the reference numeral 34 in FIG. 3.

Receiving and indicating circuit 34 comprises a radio frequency (RF) amplifier section 35 arranged to pass signals over a relatively narrow frequency range approximately centered on the operating frequency of oscillator 28. RF amplifier section 35 is further arranged to pass both the relatively high level output of oscillator 28 (e.g. of the order of volts) and the relatively low level received echo signal output of transducer 11 (e.g. of the order of microvolts). The output of RF amplifier section 35 is coupled, by means of a transformer 36, to the plate of a diode detector 37. The cathode of detector 37 is coupled both to a filter network comprising a resistor 38 and a capacitor 39 and to a second normally quiescent Hartley oscillator circuit 40. Oscillator circuit 40 serves to convert the D.C. output produced at the cathode of detector 37 to an oscillatory signal at a frequency above the audio range but also substantially lower than the frequency of oscillation of oscillator 28. Oscillator 40 may, for example, be arranged to operate at a frequency of 50 kc. The output of oscillator 40 is coupled, by means of rotary coupling transformer 25 to neon indicating lamp 18. Primary winding 25a of transformer 25 forms part of the tank circuit of oscillator 40. Capacitor 41, coupled in parallel with both secondary winding 25c and indicator lamp 18, may physically be either a small capacitor mounted on rotary arm 23 (FIG. 2) or it may consist of the distributed capacity of secondary winding 25c. In either case, capacitor 41 and secondary winding 25c are arranged to resonate at approximately the operating frequency of oscillator 40 so as to provide over-coupling in transformer 25.

The operation of the apparatus shown in FIGS. 1, 2 and 3 will now be described. Power is supplied to motor 21 and to the electrical circuits by means of, for example, a standard twelve volt battery (not shown). Motor 21 drives rotary arm 23, secondary winding 25c, core 25d, indicator lamp 18 and keying magnet 26 at a rotational speed of 1200 r.p.m. Keying magnet 26 therefore moves past keying coil 27 twelve hundred times each minute or twenty times each second. Each time permanent magnet 26 passes coil 27, the magnetic flux of magnet 26 acts upon coil 27, inducing a negative pulse in coil 27. This negative pulse is coupled via capacitor 29 and the pulse shaping network 30–32 to the base of the transistor in oscillator 28. Each negative pulse drives oscillator 28 into oscillation for a period of, for example, approximately 500 microseconds. Oscillator 28 therefore produces 1200 bursts or pulses each minute, each pulse being approximately 500 microseconds in duration and having a fundamental frequency component at 200 kc. These 200 kc. pulses of electrical energy are coupled, by means of autotransformer 33 and cable 12, to transducer 11. Transducer 11 is suspended in the water near the surface thereof by means of cable 12. Transducer 11 converts the electrical energy to mechanical energy and radiates the pulses downward through the water. After reflection of the pulses from the bottom, transducer 11 receives the pulse echoes and reconverts the mechanical energy to electrical energy.

The pulse output of oscillator 28 is also coupled to the receiving and indicating circuit 34. As will be more fully explained below, these pulses, having a fundamental frequency component at 200 kc., are converted in circuit 34 to pulses having a fundamental frequency component at 50 kc. The 50 kc. pulses are coupled, by means of rotary coupling transformer 25, to neon indicator lamp 18, causing indicator lamp 18 to flash "on." As noted earlier, magnet 26, keying coil 27, indicator lamp 18 and the "0" (zero) indication on scale 15 are arranged with respect to each other so that each transmitted pulse causes indicator lamp 18 to flash "on" as it passes the zero indication.

As each transmitted pulse travels through the water from transducer 11 to the bottom and back again to transducer 11, motor 21 rotates arm 23 and, with it, indicator lamp 18. The rotational speed of indicator lamp 18 and the depth markings on the face of scale 15 are calibrated for an average velocity of propagation of the transmitted pulse through water of 4800 feet per second. The angular displacement of indicator lamp 18 at the time of reception of a pulse echo is therefore substantially proportional to the water depth below transducer 11.

Electrical signals representative of the pulse echoes received by transducer 11 are coupled by means of cable 12 to receiving and indicating circuit 34. The pulse echo signals are amplified in RF amplifier section 35 and supplied to detector 37 by means of transformer 36. The amplified pulse echo signals, which have a fundamental frequency component at 200 kc. and a duration of approximately 500 microseconds, are converted by means of detector 37, resistor 38 and capacitor 39 into positive D.C. pulse signals approximately 500 microseconds in duration. Noise supplied to detector 37 is also similarly converted to a positive substantially D.C. noise level. Converter oscillator 40, which is normally "off," responds only to positive signals having an amplitude exceeding a predetermined triggering level. The triggering level is determined by choice of the circuit constants, particularly in the emitter circuit path of oscillator 40 so that oscillator 40 is unresponsive to noise at levels below that of the true pulse echo signals received from the maximum operational depth of the apparatus. Additionally, if desired, an external bias connected to the base of the transistor of oscillator 40 could be utilized to set the triggering level.

Oscillator 40 is triggered into oscillation each time a positive signal in excess of the triggering level is applied thereto. The oscillator remains "on" for the duration of the applied positive pulse and then is returned to its quiescent state until the next positive pulse is applied. Oscillator 40 thus produces an intermittent 50 kc. oscillatory signal with each burst or pulse of the 50 kc. signal being substantially of the same duration as the corresponding received pulse echo signal. The 50 kc. pulse signals are coupled to indicator lamp 18 by means of rotary transformer 25. Indicator lamp 18 is thus flashed "on" each time it passes the marking on scale 15 corresponding to the measured water depth.

Secondary winding 25c is constantly rotated at 1200 r.p.m. by motor 21 with respect to primary winding 25a. Variations in spacing between the two windings as one rotates with respect to the other cause variations in the mutual inductance of transformer 25. In order to minimize the effect of such variations on the operation of lamp 18, the two windings 25a and 25c are "over-coupled." The over-coupled condition is obtained by selecting the value of capacitor 41 such that capacitor 41 and the inductance of secondary winding 25c are resonant at a frequency essentially equal to the operating frequency of oscillator 40 (i.e. 50 kc.). A further benefit is derived from over-coupling the windings of transformer 25 in that the bandwidth of transformer 25 is broadened, permitting variations in the operating frequency of oscillator 40 without any significant effect on the brightness of lamp 18.

While the invention has been described in terms of a preferred embodiment, the invention is not limited to the construction of that embodiment. For example, where additional power, greater than that which can be supplied by oscillator 40 is required (e.g. where a recording instrument as well as indicator lamp 18 is supplied by oscillator 40), one or more stages of amplification may be included between oscillator 40 and lamp 18. In such a case, transformer 25 would be coupled to the output of the last stage before lamp 18. Furthermore, operating frequencies which have been mentioned are only illustrative of typical operating frequencies. For example, converter oscillator 40 may be operated at frequencies other than 50 kilocycles per second in accordance with the invention. The frequency of operation is preferably chosen above the audio range to eliminate the need for iron cores but below the higher radio frequency range which requires shielding to prevent undesirable feedback in the apparatus.

The scope of the invention is set forth in the appended claims.

We claim:

1. Echo signal detection and display apparatus comprising means for converting intermittent oscillatory echo signals having a fundamental frequency component at a first frequency into intermittent oscillatory signals having a fundamental frequency component at a second frequency substantially lower than said first frequency, a light-weight, non-ferrous core, inductive coupling means having first and second substantially concentric windings rotatable with respect to each other, at least one of said windings wound on said core, rotatable indicator means, the first of said windings being coupled to said converting means and the second of said windings being coupled to said rotatable indicator means, said rotatable indicator means being responsive to said intermittent oscillatory signals at said second frequency for producing indications representative of said intermittent echo signals, said rotatable indicator means and said second winding being coupled together for rotation thereof with respect to said first winding.

2. Echo signal detection and display apparatus comprising a signal detector for converting intermittent oscillatory echo signals having a fundamental frequency component at a first frequency into intermittent substantially single polarity, non-oscillatory signals, oscillator means coupled to said signal detector and responsive to single polarity signals above a threshold amplitude for producing intermittent oscillatory signals having a fundamental frequency component at a second frequency lower than said first frequency, said apparatus further comprising inductive coupling means having primary and secondary windings, said primary winding being coupled to said oscillator means and said secondary winding being rotatable with respect to said primary winding, capacitance means connected in parallel with said secondary winding for providing overcoupling in said inductive coupling means, said apparatus still further comprising rotatable indicator means coupled to said secondary winding for producing indications representative of detected echo signals, said indicator means and said secondary winding being coupled together for rotation thereof with respect to said primary winding.

3. Echo signal detection and display apparatus comprising means for receiving intermittent oscillatory echo signals, signal detector means coupled to said receiving means for converting said oscillatory echo signals to substantially single polarity, non-oscillatory signals, oscillator means coupled to said detector means and responsive to single polarity signals above a threshold amplitude for producing intermittent oscillatory signals having a fundamental frequency component lower than the fundamental frequency component of the said received intermittent oscillatory echo signals, said apparatus further comprising inductive coupling means having substantially concentric primary and secondary windings, said primary winding being coupled to said oscillator means, capacitance means connected in parallel with said secondary winding for overcoupling said primary and secondary windings at the frequency of operation of said oscillator means to cause said inductive coupling means to be insensitive to variations in spacing between said primary and secondary windings, said apparatus still further comprising rotatable indicator means coupled to said secondary winding for producing visible indications of received intermittent oscillatory echo signals, said secondary winding and said indicator means being rotatable together with respect to said primary winding.

4. Echo signal detection and display apparatus comprising a signal detector for converting intermittent radio-frequency oscillatory echo signals into intermittent D.C. signals, normally quiescent oscillator means coupled to said signal detector and responsive to D.C. signals above a threshold amplitude for producing oscillatory signals at a frequency higher than the audio frequency range but lower than the radio frequency of said echo signals, a plurality of light-weight, non-ferrous cores, a rotary coupling transformer having substantially concentric primary and secondary windings, each wound on a different light-weight, non-ferrous core, said windings being radially spaced apart, rotatable with respect to each other and arranged to provide substantially constant coupling during rotation of one winding with respect to the other, said apparatus further comprising a rotatable indicator lamp electrically coupled to said secondary winding and rotatable with said secondary winding with respect to said primary winding for producing visible indications of the reception of echo signals.

5. Echo signal detection and display apparatus comprising means for receiving intermittent radio-frequency oscillatory echo signals, a signal detector coupled to said receiving means for converting said echo signals into intermittent D.C. signals, normally quiescent oscillator means coupled to said signal detector for producing oscillatory signals at a frequency higher than the audio frequency range but lower than the radio frequency of said echo signals, a plurality of non-ferrous cores a rotary coupling transformer having substantially concentric primary and secondary windings, each wound on a different non-ferrous core, said windings being radially spaced apart and rotatable with respect to each other, capacitive reactance means coupled in parallel with said secondary winding and resonant with the inductive reactance thereof at substantially the oscillation frequency of said oscillator means for overcoupling said rotary coupling transformer to cause said transformer to be insensitive to variations in spacing between said primary and secondary windings, a rotatable indicator lamp coupled in parallel with said secondary winding and a motor having a rotatable shaft, said shaft being coupled to said indicator lamp, said secondary winding and said core of said secondary winding for rotation thereof with respect to said primary winding.

6. An echo ranging system comprising a circular depth indicating scale, a depth indicator lamp, rotational motion apparatus for moving said indicator lamp at a substantially constant rate of speed around a circular path adjacent said depth indicating scale, means for producing a keying signal at a predetermined point in the travel of said indicator lamp, a first normally quiescent oscillator coupled to said keying signal producing means for generating oscillatory pulse signals at a first fundamental frequency in response to each of said keying signals, a transducer coupled to said first oscillator for producing a pulse of sonic energy in response to each oscillatory pulse signal, said transducer being adapted to receive echoes of said sonic energy and to reconvert each of said echoes to an oscillatory pulse echo signal, a detector coupled to said transducer for converting each oscillatory pulse echo signal into a D.C. pulse signal, a second normally quiescent oscillator insensitive to noise and responsive to D.C. signals above a threshold amplitude only and coupled to said detector for generating oscillatory pulse signals at a second frequency substantially lower than said first frequency, a plurality of lightweight, non-ferrous cores, a rotary transformer having substantially concentric primary and secondary windings, said windings being radially spaced apart and rotatable with respect to each other, capacitance means connected in parallel with said secondary winding for overcoupling said rotary transformer to cause said transformer to be insensitive to variations in spacing between windings during rotation of one winding with respect to the other, said primary winding being coupled to said second oscillator, said secondary winding being electrically coupled to said depth indicator lamp and physically coupled to said rotational motion apparatus whereby said indicator lamp and said depth indicating scale provide visible indications of reception of echo signals.

References Cited by the Examiner

UNITED STATES PATENTS

| | | | |
|---|---|---|---|
| 2,400,796 | 5/1946 | Watts et al. | 340—3 |
| 2,482,561 | 9/1949 | Shenk | 328—25 X |
| 2,859,336 | 11/1958 | Cluwen | 328—25 X |
| 3,122,719 | 2/1964 | Grieg | 340—1 |

FOREIGN PATENTS 473,597    3/1929    Germany.

CHESTER L. JUSTUS, *Primary Examiner.*

R. A. FARLEY, *Assistant Examiner.*